UNITED STATES PATENT OFFICE.

JOSY FLOHR, OF RODANGE, LUXEMBURG, ASSIGNOR TO SOCIETE ANONYME DES-HAUTS-FOURNEAUX ET FORGES DE DUDELANGE, OF DUDELANGE, LUXEMBURG.

MANUFACTURE OF IRON OR STEEL BY THE BASIC BESSEMER PROCESS.

No. 920,560.  Specification of Letters Patent.  Patented May 4, 1909.

Application filed May 16, 1908. Serial No. 433,261.

*To all whom it may concern:*

Be it known that I, JOSY FLOHR, a subject of the Grand Duchy of Luxemburg, engineer, residing at Rodange, Luxemburg, have invented new and useful Improvements in or Connected with the Manufacture of Iron or Steel by the Basic Bessemer Process, of which the following is a specification.

In application Serial No. 329505 filed August 6th, 1906, I have described a process for cooling and dephosphorizing the molten charge in a basic Bessemer converter. In such application it was proposed to use briquets made of a mixture of slaked lime and substances containing ferric oxid such as hammer scale, rolling mill dross and the like, and I have since found that briquets made exclusively of calcium hydroxid will in many cases effect the desired result and thus render the use of ferric oxid unnecessary.

The process described in my former application referred to consists, broadly speaking, of the following steps: Toward the end of the decarburizing period or later, the converter is tilted and charged with an addition of a mixture of calcium hydroxid (slaked lime) or other suitable substance such as a mixture of limestone or unburned lime and clay and substances containing ferric oxid. With regard to this latter, use is preferably made of substances such as hammer scale, rolling mill dross or other suitable substances containing ferric oxid, such as rich iron ores, or rich pulverulent ores, such as occur in Brazil, and the mixture of ferric oxid and calcium hydroxid or the like is preferably compressed into briquets, the $CaH_2O_2$ acting also as a binding medium for the oxid. With these additions, the effect on the hot metal is surprisingly effective, and the process is completed by sending the blast through the charge for a few seconds.

According to this invention pure burnt lime, slaked with water, is pressed into bricks and only dried to such an extent that the calcium hydroxid remains as such in an undecomposed state. The calcium hydroxid briquets, produced in this manner, are added to the fluid bath in the converter, exactly as described in specification Ser. No. 329505.

Having now particularly described and ascertained the nature of my said invention and in what manner the same is to be performed, I declare that what I claim is:

The herein described process of producing iron and steel, consisting in blowing air through molten pig iron contained in a converter, until the carbon is wholly or almost wholly burned, and then introducing calcium hydrate briquets into the bath and again blowing in air until the refining operation is completed.

In testimony whereof I have signed my name to this specification in the presence of two subscribing witnesses.

JOSY FLOHR.

Witnesses:
CHARLES DUMONT,
FRANÇOIS HAMES.